United States Patent
Ozawa et al.

(10) Patent No.: US 6,507,991 B1
(45) Date of Patent: Jan. 21, 2003

(54) MANUFACTURING METHOD FOR SLOTLESS STATOR, AND ROTATING ELECTRICAL MACHINE

(75) Inventors: Masaru Ozawa, Wako (JP); Takeo Fukuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/648,057

(22) Filed: Aug. 25, 2000

(30) Foreign Application Priority Data

Aug. 26, 1999 (JP) .............................. 11-240589

(51) Int. Cl.[7] .............................................. H02K 15/02
(52) U.S. Cl. ............................ 29/596; 310/42; 310/254
(58) Field of Search .......................... 29/596, 598, 597; 242/432.6, 473.2, 571; 310/254, 42, 259, 179

(56) References Cited

U.S. PATENT DOCUMENTS

| | | | | |
|---|---|---|---|---|
| 3,831,267 A | * | 8/1974 | Onishi et al. | 29/598 |
| 4,563,808 A | * | 1/1986 | Lender | 29/596 |
| 5,592,731 A | * | 1/1997 | Huang et al. | 29/596 |
| 6,219,900 B1 | * | 4/2001 | Suzuki | 29/598 |
| 6,226,856 B1 | * | 5/2001 | Kazama et al. | 29/596 |

FOREIGN PATENT DOCUMENTS

| | | |
|---|---|---|
| DE | 1613202 A | 4/1970 |
| DE | 1488442 A | 1/1972 |
| JP | 52057906 A | 5/1977 |
| JP | 03107354 A | 5/1991 |
| JP | 08140294 A | 5/1996 |
| WO | WO9401916 A | 1/1994 |

* cited by examiner

Primary Examiner—Gregory M. Vidovich
Assistant Examiner—Stephen Kenny
(74) Attorney, Agent, or Firm—Carrier, Blackman & Associates, P.C.; Joseph P. Carrier; William D. Blackman (57) ABSTRACT

A manufacturing method of a slotless stator, involves assembling jointly define two divided cores which a stator core into a cylindrical shape, so as to contain therebetween a cylindrically shaped stator winding, wherein the stator winding an outer diameter larger than an inner diameter of the stator core in the uncompressed condition. By so doing, the stator winding is assembled inside the stator core in a radially inward compressed condition. At this time, since the stator winding functions as a spring pressing the inside of the stator core so as to expand in the normal direction (the radial outward direction), winding is mechanically secured by the resilient spring force at that time to the inner periphery of the stator core. Hence there is no longer the need for a special fixation mechanism or adhesive when assembling the stator core winding and stator core together.

10 Claims, 6 Drawing Sheets

MANUFACTURING METHOD FOR SLOTLESS STATOR, AND ROTATING ELECTRICAL MACHINE

BACKGROUND OF THE INVENTION

1. Field of the Invention

The present invention relates to a manufacturing method for a slotless stator where a stator winding is secured to the inner periphery of a stator core having no slots, and to a rotating electrical machine incorporating the slotless stator.

This application is based on Japanese Patent Application No. 11-240589, the contents of which are incorporated herein by reference.

2. Description of the Related Art

Heretofore as a rotating electrical machine incorporating a slotless stator where a cylindrically shaped stator winding is fitted to the inner periphery of a cylindrically shaped stator core having no slots, there is known the rotating electrical machine disclosed in Japanese Patent No. 2554859.

Moreover, in the same publication there is disclosed a method where a rod shape temporary support member on the outer periphery of which a stator winding has been performed, is inserted from one end opening of a cylindrically shaped stator core. The temporary support member is then withdrawn leaving the stator winding inside the stator core, and the stator winding is affixed to the inner periphery of the stator core by impregnating the winding with resin and then hardening the resin.

However, with this method, since this involves inserting the stator winding from the end opening of the stator core with the stator winding secured to the temporary support body, the outer diameter of the stator winding must be formed smaller than the inner diameter of the stator core.

Consequently, by simply withdrawing the temporary support member and arranging the stator winding inside the stator core, the stator winding is not secured to the inner periphery of the stator core.

Therefore, resin must be impregnated into the stator winding and hardened, to secure the stator winding to the inner periphery of the stator core with adhesive force. Hence the assembly process becomes complicated.

SUMMARY OF THE INVENTION

The present invention takes into consideration the above situation, with the object of obviating the need for a special fixation mechanism or adhesive, to thereby simplify the assembly of a slotless stator.

In order to achieve the above object, the present invention adopts the following means.

That is to say, a manufacturing method for a slotless stator according to the present invention is characterized in comprising an assembly step in which a plurality of divided cores which jointly define a cylindrically shaped a stator core having no slots, are assembled into a cylindrical shape so as to contain a cylindrical shape stator winding therebetween, and wherein the winding has an outer diameter larger than an inner diameter of the stator core in a natural or uncompressed condition of the winding.

With this construction, the stator winding is fitted inside the stator core in a condition of being compressed radially inwards.

At this time, since the stator winding functions as a spring pressing the inside of the stator core so as to expand in the normal direction (the radial outward direction), the winding is pressed by the resilient spring force at that time against the inner periphery of the stator core.

Therefore, by this resilient force the stator winding is mechanically secured to the inner periphery of the stator core, and hence a special fixation mechanism or adhesive is not required.

Furthermore, when a current flows in the stator winding, heat is generated so that an outward expanding force acts on the stator winding. Hence at the time of operating, the winding is secured even more stably within the core.

With the manufacturing method for a slotless stator according to the present invention, in the case where a resilient material is inserted between the divided core and the stator winding, the resilient force acting in the normal direction can be further strengthened, and hence the stator winding can be more stably secured within the core.

In particular, in the case where a silicone sheet which contains a filler with good thermal conductivity such as boron nitride, such as used for transistor heat dissipation purposes is used as the resilient material, the heat dissipation is improved and cooling efficiency is also improved.

With the method of constructing a slotless stator according to the present invention as described above, there is no need for an adhesive for securing the stator winding to the inner periphery of the stator core. However, there is the case where the stator winding is immersed in a resin such as varnish in order to electrically insulate between the windings.

In this case, preferably the resin is impregnated, in a condition with the stator winding secured to the inner periphery of the stator core.

With this construction, the situation where the resin which is thickly attached to the outer peripheral side of the stator winding hardens so that elastic restoration of the stator winding is restricted, can be effectively avoided.

That is to say, if the stator winding is fitted to inside the stator core after being impregnated with resin, the resin hardens before fitting, giving the undesirable situation in that fixation utilising the resilient force of the stator winding becomes difficult. With the above construction, this undesirable situation does not arise.

Moreover, the rotating electrical machine according to the present invention, incorporates a slotless stator where inside a cylindrical stator core having not slots there is arranged a cylindrically shaped stator winding having a larger outer diameter than an inner diameter of the stator core, in a resiliently compressed condition, and the stator winding is secured to the inner periphery of the stator core by a resultant resilient force.

Also with this construction, in the above manner, the stator winding inside the stator core functions as a spring, so that the winding is mechanically secured to the inner periphery of the stator core by the resilient spring force.

Hence a special fixation mechanism or adhesive is not required, giving a rotating electrical machine with simple assembly for the slotless stator there of.

DESCRIPTION OF THE PREFERRED EMBODIMENTS

Hereunder is a description of embodiments of the present invention with reference to the drawings.

Figure 1:
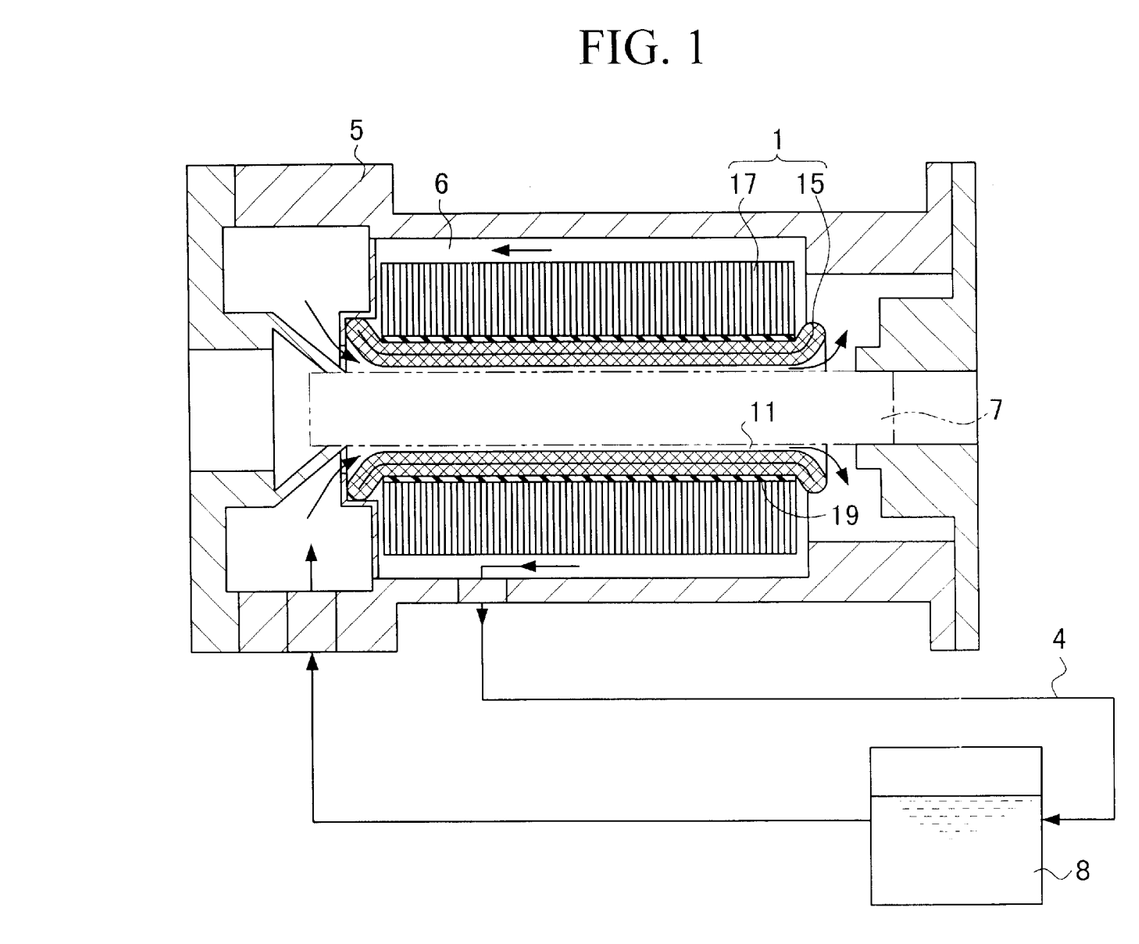
FIG. 1 is a longitudinal cross-section showing an embodiment of a rotating electrical machine according to the present invention.

FIG. 1 shows a rotating electrical machine 3 incorporating a slotless stator 1. This rotating electrical machine 3 is suitable for use in a high speed rotating electric machine which is used for example at several kW to several tens of kW, and at rotational speeds above several ten thousand rpm.

With the rotating electrical machine 3, the outer shape is formed from a casing 5, and a rotor 7 is rotatably arranged via bearings (not shown) along a central axis of the casing 5.

An oil passage 6 constituting one part of an oil pressure circuit 4 is formed in the casing 5.

Lubricating oil is supplied to the oil passage 6 from a supply source 8, and by means of this lubricating oil, lubrication of the bearings and cooling of the slotless stator 1 is simultaneously performed.

At this time, the cooling of the slotless stator 1 is performed in sequence from the inner periphery thereof to the outer periphery, thereof as shown by the arrow in FIG. 1.

A permanent magnet serving as a magnetic field generating device is incorporated into the rotor 7.

The permanent magnet is constructed so that p (where p is an even number of two or more) magnetic poles for generating a magnetic flux in the radial direction, are formed on the outer surface of the rotor 7.

For the permanent magnet, a rare earth magnet such as a Sm—Co, Nd—Fe—B sintered magnet is suitable.

The slotless stator 1 is arranged around the rotor 7, forming a small gap 11 via an inner tube (omitted from the figure).

This inner tube is for containing the lubricating oil which flows on the inner peripheral side of the slotless stator 1 (shown by the arrow in FIG. 1), and is made for example from a zirconia ceramic having non magnetic and non conducting properties. The inner tube may be replaced with another ceramic material such as alumina.

The slotless stator 1 is one which is not formed with slots for securing a stator winding 15.

Moreover, the slotless stator 1 is constructed with the stator winding 15 located on the rotor 7 side and a stator core 17 located on the casing 5 side. The stator winding 15 having an outer diameter larger than the inner diameter of the stator core 17 natural condition is arranged inside the stator core 17 with a resiliently contracted diameter.

The stator core 17 is in the form of a hollow cylindrical body with a cylindrical surface which is not formed with slots on the inner peripheral surface, thereof and is secured to the casing 5 so that the oil passage 6 for passing lubricating oil (shown by the arrow in FIG. 1) is formed between the outer periphery thereof and the inner periphery of the casing 5.

Figure 5:
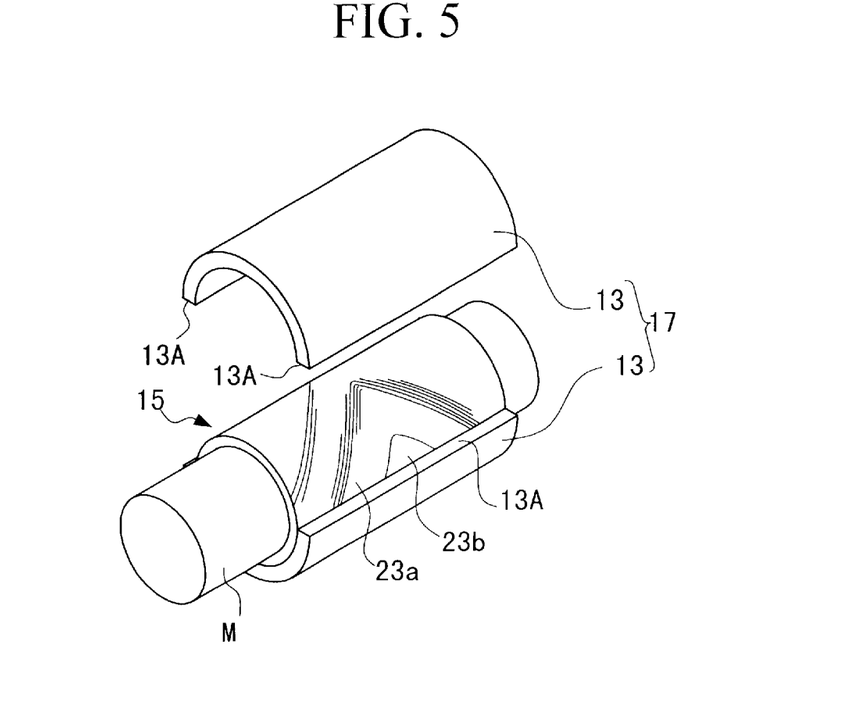
FIG. 5 is a perspective view showing a condition where the stator winding is being fitted inside a stator core of divided construction.
Figure 6:
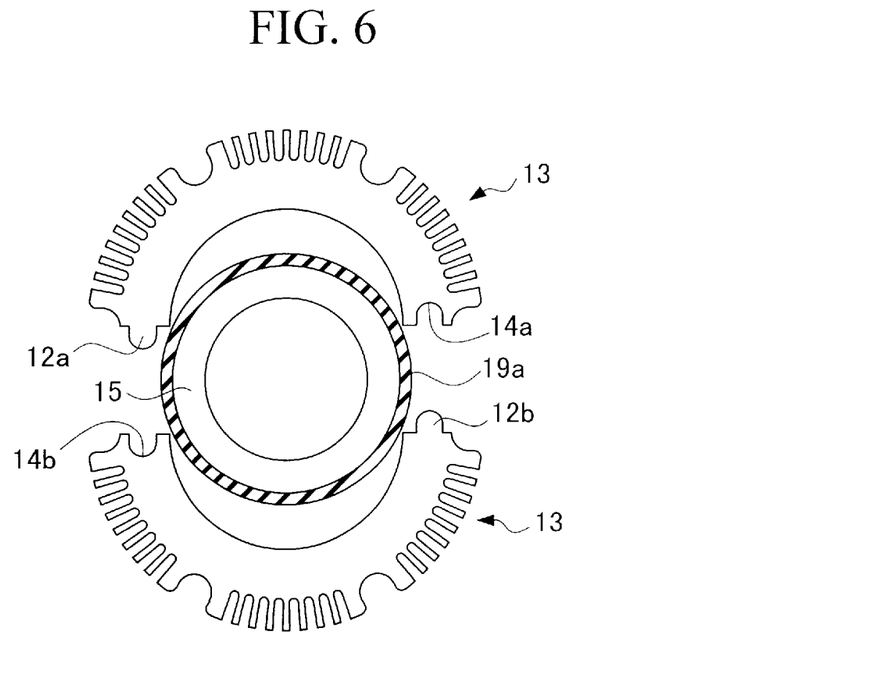
FIG. 6 is a transverse cross-sectional view showing a condition where the stator winding is arranged inside divided cores which are oppositely arranged at a predetermined spacing.
Figure 7:
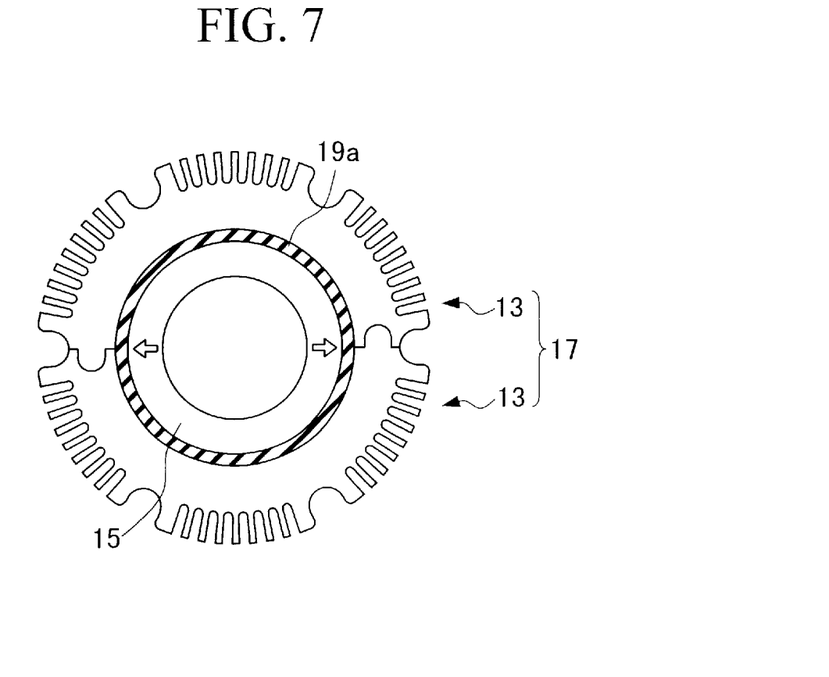
FIG. 7 is a transverse cross-section showing the divided cores assembled into a cylindrical shape so as to contain the stator winding.

Moreover, the stator core 17, as shown in FIG. 5 through FIG. 7 is made up of two divided cores 13 evenly divided circumferentially.

The division surfaces 13A of these divided cores 13 are respectively formed with an engaging protrusions and engaging recess 12a, 14a and 12b, 14b (see FIGS. 6–7). The engaging protrusion and engaging recess 12a, 14a of one of the divided cores 13 engage with the engaging recess and engaging protrusion 14a and 12b of the other divided core 13.

In FIG. 5, the shape of the divided cores 13 is simplified, and a more accurate shape is as shown in FIG. 6 and FIG. 7.

The stator winding 15 is of a hollow cylindrical shape having an outer diameter larger than the inner diameter of the stator core 17 in the natural or non-compressed condition, and is secured to the stator core 17 via an insulation layer 19 so that the inner peripheral face of the stator core 17 faces the outer peripheral face of the stator winding 15.

Next is a description using FIG. 2 through FIG. 9, of an embodiment of a manufacturing method for the slotless stator according to the present invention.

Figure 2:
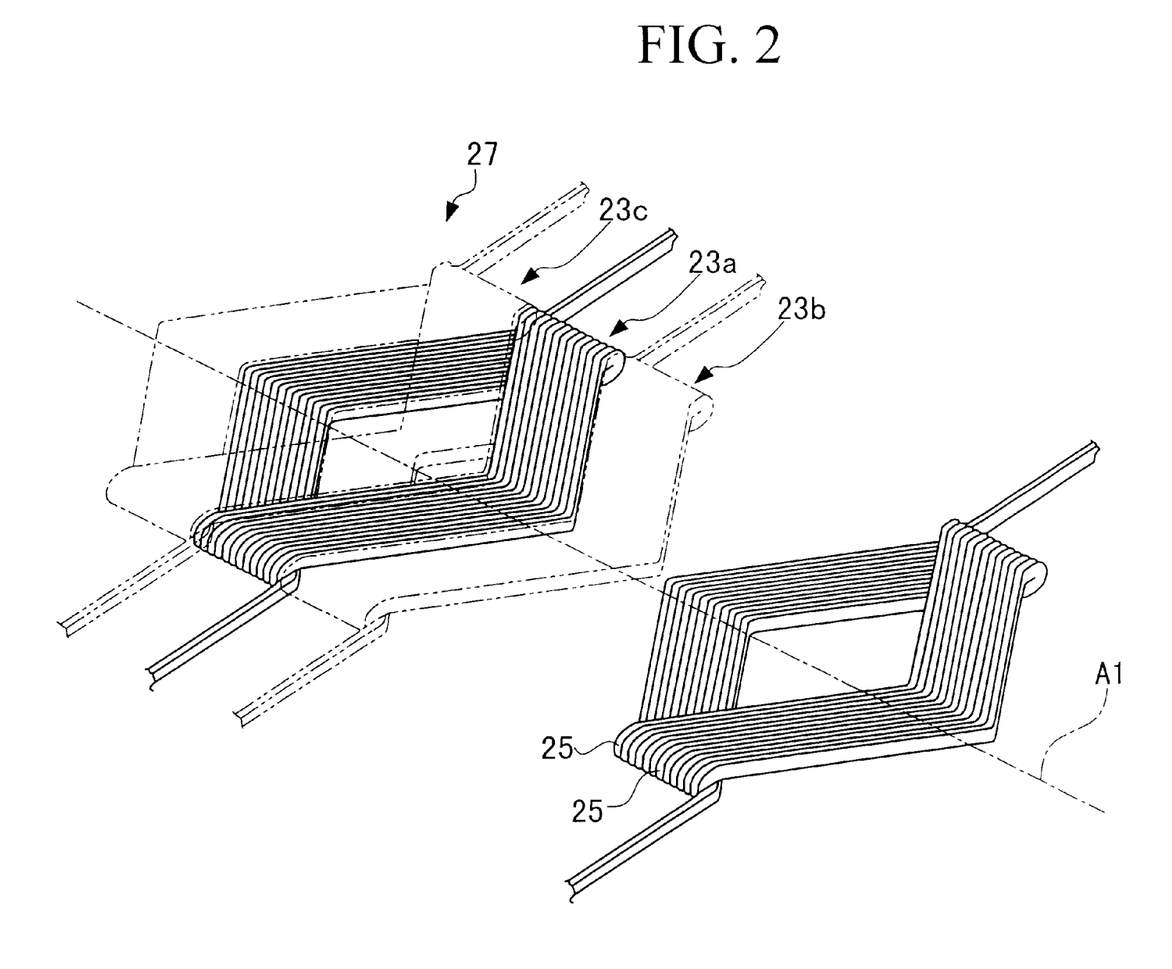
FIG. 2 is a diagram for explaining an embodiment of a manufacturing method for a slotless stator winding according to the present invention, being a perspective view showing a condition where a band shaped body is formed from a plurality of coil segments.

At first, a hollow cylindrical shaped stator winding 15 is formed by combining together a plurality of approximately rhombic shape coil segments 23a, 23b, and 23c.

The coil segments 23a, 23b and 23c are formed by forming turns by winding a wire sheaf 25 of a plurality of fine wires composed of conductors bundled together, through one turn in an rhombic shape, and then winding and arranging a plurality of the turns so that the turns are sequentially shifted continuously so as to be adjacent to each other in the direction of one diagonal A1 of the rhombic shape (refer to FIG. 2).

Figure 3:
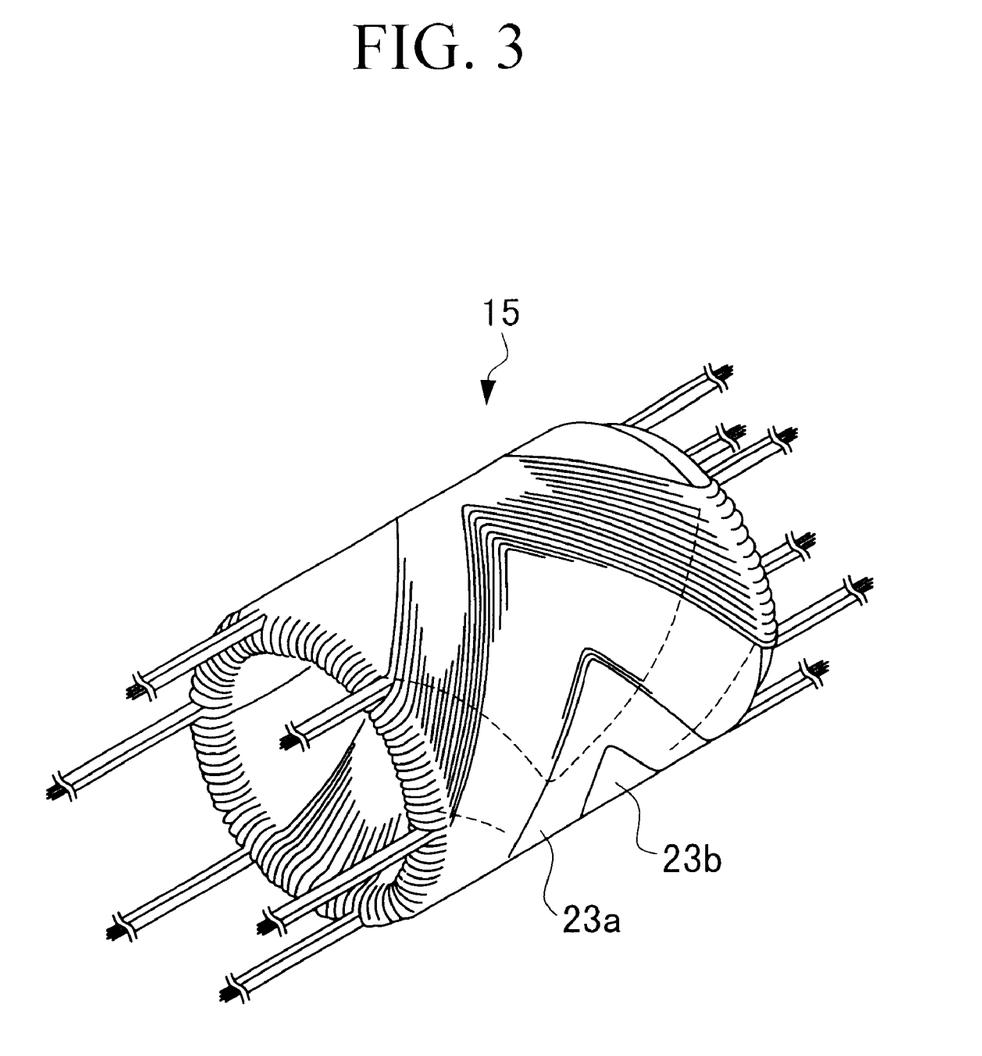
FIG. 3 is a perspective view showing a stator winding formed by wrapping the band shape body comprising the plurality of coil segments, into a cylindrical.

Then after sequentially shifting and overlapping the coil segments 23a, 23b and 23c in the direction of the diagonal line A1 to form a band shaped body 27, the band shaped body 27 is rolled into a hollow cylindrical shape to thereby give the hollow cylindrically shaped stator winding 15 (refer to FIG. 3).

Figure 4:
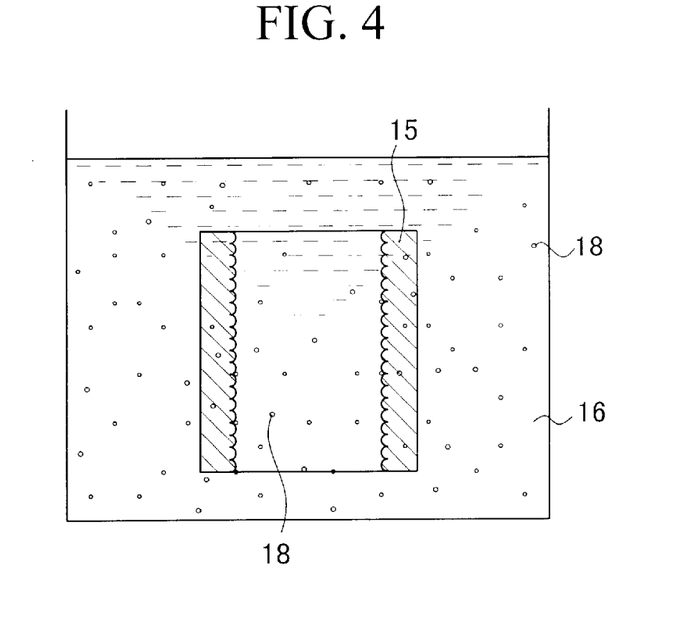
FIG. 4 is a diagram showing a condition where the stator winding is immersed in an alcohol solvent in which BN particles have been mixed.

After this, the stator winding 15 is immersed in an alcohol solvent 16 into which BN particles 18 have been mixed so that the BN particles 18 are filled from the surface of the stator winding 15 to the interior thereof (refer to FIG. 4). Here rather than immersing, a technique involving dripping may be used.

After this, the stator winding 15 is withdrawn from the alcohol solvent 16 and air dried to evaporate the volatile alcohol.

Next, the silicone sheet 19a (omitted from FIG. 5) constituting one portion of the insulating layer 19 is wrapped around the outer periphery of the stator winding 15, and the stator winding 15 is then assembled inside the stator core 17.

Hereunder is a detailed description using FIG. 6 and FIG. 7, of the steps of assembling the stator winding 15 inside the stator core 17.

At first, the two divided cores 13 are oppositely arranged so that the inner peripheral faces thereof face each other with a constant gap therebetween in the vertical direction.

This gap is set sufficiently larger than the outer diameter of the stator winding 15.

Then the stator winding 15 is mounted on the inner peripheral face of the lower divided core 13, using a rod shape jig M. This divided core 13, and the upper divided core 13 are then brought together to engage the engaging protrusions 12a and 12b with the engaging recesses 14a and 14b.

By so doing, the stator winding 15 is assembled inside the stator core 17 in a radially inward compressed condition.

At this time, since the stator winding 15 effectively functions as a spring pressing the inside of the stator core 17 so as to expand in the normal direction (the radial outward direction), the winding is pressed by the resilient force at that time against the inner periphery of the stator core 17.

By this resilient force, the stator winding 15 is mechanically secured to the inner periphery of the stator core 17, and hence a special fixation mechanism or adhesive is not required.

Moreover, since the stator winding 15 is assembled inside the stator core 17 with the silicone sheet 19a wrapped around the outer periphery thereof, the resilient force acting in the normal direction is further strengthened by the resiliency of the silicone sheet 19a which is compressed between the winding and the core, so that the stator winding 15 is more stably secured.

Figure 8:
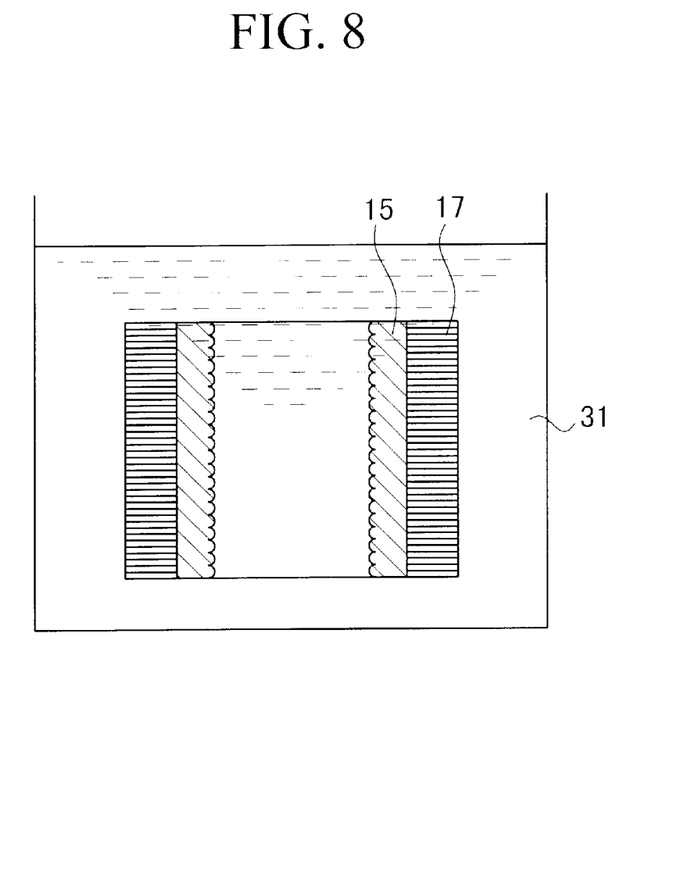
FIG. 8 is a diagram showing a condition where the stator core and stator winding are immersed in a varnish tank while being held together.
Figure 9:
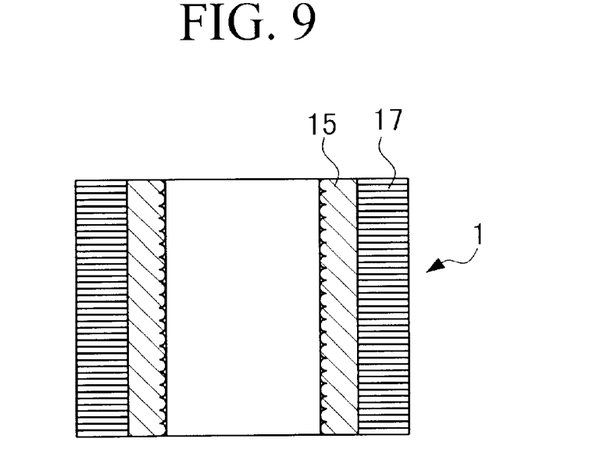
FIG. 9 is a longitudinal cross-section showing the completed slotless stator with the varnish hardened.

After this, the stator core 17 and the stator winding 15 are held together as one and immersed in a varnish impregnation tank 31 (refer to FIG. 8).

At this time, since the outer peripheral face of the stator winding 15 and the inner peripheral face of the stator core 17 are in close contact with the silicone rubber sheet 19a, there is practically no impregnation between these forces with the varnish.

Then, after impregnating the varnish into the stator winding 15, the stator core 17 and the stator winding 15 are withdrawn from the varnish impregnating tank 31 as one. Then by heat hardening the varnish, the manufacture of the slotless stator is completed (refer to FIG. 9).

As described above, with the manufacturing method for a slotless stator according to the present invention, by assembling the two divided cores 13 into a cylindrical shape so as to contain the stator winding 15 which normally has an outer diameter larger than the inner diameter of the stator core 17 in the natural non-compressed condition, the stator winding 15 functions as a spring and produces a resilient force pressing the inside of the stator core 17 so as to expand in the normal direction (the radial outward direction). Therefore, the stator winding 15 is mechanically secured by this resilient force to the inner periphery of the stator core 17.

Consequently, the manufacturing method of the invention is simplified in comparision to conventional methods because as high accuracy axial alignment not being required, as with the case where the stator winding 15 is inserted from one open end of a stator core formed integrally in a cylindrical shape, and because adhesive or a special fixation mechanism for securing the stator winding 15 inside the stator core 17 is not required. Hence the assembly of the slotless stator 1 can be performed very easily.

Moreover, since the stator core 17 and the stator winding 15 are immersed in a varnish impregnation tank 31 with the stator winding 15 secured to the inner periphery of the stator core 17, the varnish is hardly impregnated into the outer peripheral side of the stator winding 15.

Consequently, the situation where varnish which is thickly attached to the outer peripheral side of the stator winding 15 hardens so that the elastic restoration of the stator winding 15 is restricted, can be effectively avoided. Hence the stator winding 15 can be stably secured to the inner periphery of the stator core 17.

Furthermore, when a current flows in the stator winding 15, heat is generated so that an additional outward expanding force acts. Hence at the time of operating, the stator winding 15 is secured even more stably to the stator core.

Moreover, with the present embodiment, since the silicone sheet 19a is disposed between the divided core 13 and the stator winding 15, the resilient force acting in the normal direction is further strengthened by the resiliency of the silicone sheet which is compressed between the winding and the core, so that the stator winding 15 is even more stable secured.

In particular, in the case where a silicone sheet which contains a filler with good thermal conductivity such as boron nitride, such as used for transistor heat dissipation purposes is used as the resilient material, since the thermal conductivity is higher than that of varnish, the heat dissipation for the stator winding 15 is improved and cooling efficiency is also improved.

In particular, with the present embodiment, since lubricating oil is circulated on the inner peripheral side of the stator winding 15, a further improvement in the cooling efficiency is achieved.

Here with the above embodiment, the cylindrically shaped stator winding 15 is formed by combining together the approximately rhombic shaped plurality of coil segments 23a, 23b, and 23c. However this may of course be formed by some other method.

Moreover, the stator core 17 is constructed from two divided cores 13. However, the number of divisions may be three or more.

As will be clear from the above description, with the present invention, by having a divided construction for the stator core, and assembling a stator winding having an outer diameter greater than the inner diameter of the stator core thereinside, winding functions as a spring for producing a resilient force in the normal direction on the stator winding. By this resilient force, the stator winding is mechanically secured to the inner periphery of the stator core. Therefore a special fixation mechanism or adhesive is not required, thus simplifying assembly of the slotless stator.

Furthermore, in the case where a resilient material is disposed between the divided core and the stator winding, the resilient force in the normal direction is further strengthened by the resiliency of the material which is compressed between the winding and the core. Hence the securing force for the stator winding can be further increased.

In particular, in the case where a silicone sheet which contains a filler with good thermal conductivity such as boron nitride, such as used for transistor heat dissipation purposes is used as the resilient material, the heat dissipation is improved. Hence not only is the securing strength improved but also an improvement in cooling efficiency can be achieved.

Moreover, in the case where a resin is impregnated into the stator winding, by impregnating the resin in a condition with the stator winding secured to the inner periphery of the stator core, the resin is no longer thickly attached to the outer peripheral side of the stator winding. Therefore any restriction on elastic restoration of the stator winding due to the resin attached to the outer periphery hardening can be effectively avoided. Hence the stator winding can be stably secured inside the stator core.

Moreover, with the stator winding according to the present invention, by arranging the cylindrically shaped stator winding having a larger outer diameter than the inner diameter of the stator core in a resiliently compressed condition inside the cylindrical stator core having no slots, then in the above manner, the stator winding functions effectively as a spring inside the stator core, so that to is mechanically secured to the inner periphery of the stator core by the resilient spring force. Hence a special fixation mechanism or adhesive is not required, thus simplifying assembly of the slotless stator. Although there have been described what are presently considered to be the preferred embodiments of the invention, it will be understood by persons skilled in the art that variations and modifications may be made thereto without departing from the gist, spirit or essence of the invention. The scope of the invention is indicated by the appended claims.

What is claimed is:

1. A manufacturing method for a slotless stator comprising an assembly step in which a plurality of divided cores which jointly define a cylindrically shaped stator core having no slots, are assembled into a cylindrical shape so as to contain a cylindrically shaped stator winding therebetween and wherein said winding has an outer diameter larger than an inner diameter of said stator core in an uncompressed condition of said winding.

2. A manufacturing method for a slotless stator according to claim 1, comprising a further step of inserting a resilient material between said divided cores and said stator winding.

3. A manufacturing method for a slotless stator according to claim 2, wherein a silicone sheet is used as said resilient material.

4. A manufacturing method for a slotless stator according to claim 1, comprising a further step of impregnating resin into the stator in a condition with said stator winding secured to an inner periphery of said stator core.

5. A manufacturing method for a slotless stator according to claim 2, comprising a further step of impregnating resin into the stator in a condition with said stator winding secured to an inner periphery of said stator core.

6. A manufacturing method for a slotless stator according to claim 3, comprising a further step of impregnating resin into the stator in a condition with said stator winding secured to an inner periphery of said stator core.

7. A manufacturing method for a slotless stator according to claim 4, comprising a further step of hardening the resin after the resin impregnating step.

8. A manufacturing method for a slotless stator comprising the assembly steps of:

forming a band shaped body by combining a plurality of approximately rhombic shaped coil segments;

forming a hollow cylindrical shaped stator winding by winding said band shaped body into a hollow cylindrical shape;

wrapping a resilient and insulating sheet around the outer periphery of said cylindrical shaped stator winding;

preparing two divided cores of a cylindrical core into separate pieces respectively having engaging portions;

mounting said cylindrical shaped winding covered by said resilient sheet in an peripheral face of one of said divided cores;

assembling together the other of said divided cores on said one divided core to form said cylindrical core while maintaining said stator winding inside of the cylindrical core such that the stator winding presses the inside of the cylindrical core in a radially outward direction; wherein an outer diameter of said stator winding prior to said assembly is larger than an inner diameter of said cylindrical core and impregnating varnish into the stator winding and hardening the varnish.

9. A manufacturing method for a slotless stator according to claim 8, wherein said assembly step causes the assembled cores to compress said winding.

10. A manufacturing method for a slotless stator according to claim 1, wherein said assembly of said divided cores together with said winding causes the assembled cores to compress said winding.

* * * * *

UNITED STATES PATENT AND TRADEMARK OFFICE
CERTIFICATE OF CORRECTION

PATENT NO.    : 6,507,991 B1
DATED         : January 21, 2003
INVENTOR(S)   : Masaru Ozawa and Takeo Fukuda It is certified that error appears in the above-identified patent and that said Letters Patent is hereby corrected as shown below:

Title page,
Item [57], ABSTRACT,
Line 1, after "stator" delete the comma;
Line 2, change "jointly define two divided cores which" to -- two divided cores which jointly define --;
Line 3, after "shape" delete the comma;
Line 6, change "condition." to -- condition of the winding. --; change "so doing" to -- this method --.
Line 11, before "winding" insert -- the --.

Column 1,
Line 24, change "performed" to -- preformed --.
Line 56, before "stator" delete "a".

Column 2,
Line 45, change "not" to -- no --.
Line 57, change "there of" to -- thereof --.

Column 3,
Line 2, change "shape" to -- shaped --.
Line 3, before the period insert -- shape --.
Line 46, change "periphery, thereof" to -- periphery thereof, --.

Column 4,
Line 5, before "natural" insert -- in its non-compressed or --.
Line 9, change "surface, thereof" to -- surface thereof, --.
Line 18, delete "an".
Line 38, change "cylindrical" to -- cylindrically --.
Line 44, before "rhombic" insert -- approximately --.

Column 5,
Line 52, after "natural" insert -- or --.
Line 60, change "comparision" to -- comparison --.
Line 61, delete "as".

Column 6,
Line 21, change "stable" to -- stably --.
Line 38, after "However" insert a comma.
Line 47, after "thereinside," insert -- the --.

Column 7,
Line 14, change "to is" to -- the winding is --.
Line 18, begin a new paragraph with "Although".
Line 30, after "therebetween" insert a comma.

UNITED STATES PATENT AND TRADEMARK OFFICE
CERTIFICATE OF CORRECTION

PATENT NO. : 6,507,991 B1
DATED : January 21, 2003
INVENTOR(S) : Masaru Ozawa and Takeo Fukuda It is certified that error appears in the above-identified patent and that said Letters Patent is hereby corrected as shown below:

<u>Column 8,</u>
Line 25, change "an peripheral" to -- a peripheral --.
Line 33, after "assembly" insert -- step --.

Signed and Sealed this

Twenty-sixth Day of August, 2003

JAMES E. ROGAN
*Director of the United States Patent and Trademark Office*